(12) United States Patent
Bolkart et al.

(10) Patent No.: US 6,540,452 B1
(45) Date of Patent: Apr. 1, 2003

(54) DRILLING TOOL FOR MACHINE TOOLS AND METHOD FOR THE PRODUCTION THEREOF

(75) Inventors: Dietmar Bolkart, Bietigheim-Bissingen (DE); Gerhard Scheer, Loechgau (DE); Konstantin Baxivanelis, Besigheim (DE); Michael Koecher, Stuttgart (DE); Jacek Kruszynski, Stuttgart (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 0 days.

(21) Appl. No.: 09/582,139
(22) PCT Filed: Dec. 10, 1998
(86) PCT No.: PCT/EP98/08041
§ 371 (c)(1), (2), (4) Date: Jun. 20, 2000
(87) PCT Pub. No.: WO99/32245
PCT Pub. Date: Jul. 1, 1999

(30) Foreign Application Priority Data

Dec. 22, 1997 (DE) ......................... 197 56 795

(51) Int. Cl.⁷ .............................................. B23B 51/02
(52) U.S. Cl. ..................... 408/230; 76/5.4; 76/108.1; 76/108.6; 408/59
(58) Field of Search ................. 76/5.4, 107.4, 76/108.6, 108.1, 115; 408/144, 57, 59, 229, 230, 83

(56) References Cited

U.S. PATENT DOCUMENTS

| | | | |
|---|---|---|---|
| 2,216,462 A | * | 10/1940 | Spang ................. 76/108.6 |
| 2,223,107 A | * | 11/1940 | Hurschman ........... 76/108.6 |
| 2,324,748 A | * | 7/1943 | Welch ................. 76/108.1 |
| 2,405,298 A | | 8/1946 | Fleischer |
| 2,541,849 A | | 2/1951 | Villeneuve |
| 2,750,817 A | * | 6/1956 | Eder ..................... 408/59 |
| 2,882,765 A | * | 4/1959 | Andreasson ............ 408/59 |

(List continued on next page.)

FOREIGN PATENT DOCUMENTS

| | | |
|---|---|---|
| DE | 916 144 | 8/1954 |
| DE | 25 12 854 | 10/1975 |
| DE | G 86 30 241.8 | 4/1987 |

(List continued on next page.)

OTHER PUBLICATIONS

Bohren in der Grauzone, Werkzeuge Jun. 1997 (pp. 40–41).
Berichte—Das Schmieden der Spannuten an Gewindebohrern, Werkstatttechnik und Maschinenbau, 46 Jg., Mar. 1956, pp. 131–133.

*Primary Examiner*—Daniel W. Howell
(74) *Attorney, Agent, or Firm*—Flynn, Thiel, Boutell & Tanis, P.C.

(57) ABSTRACT

The invention relates to a drilling tool for machine tools and to a method for the production thereof. The drilling tool has at least one chip conveyor groove (16) and at least one functional channel (20). In order to produce the body of the drill (10), the wall of a tubular metal blank is simultaneously impinged upon by substantially radially oscillating form-giving forces in several forming sections spread over the periphery, moving in an axial direction along the surface of the blank, whereby at least one chip conveyor groove (16) is shaped and at least one functional channel (20) is formed. When the chip conveyor grooves (16) are formed on at least two interspaced forming sections in a peripheral direction in the wall of the blank (50), the parts of the wall in the area of two opposite-lying chip conveyor grooves (16) come to rest against each other in a sealed manner, defining at least two functional channels (20, 24) on the inner surfaces thereof. The joint (40) thus formed can be closed by means of cold welding or soldering.

56 Claims, 9 Drawing Sheets

U.S. PATENT DOCUMENTS

| | | | |
|---|---|---|---|
| 2,903,921 A | | 9/1959 | Andreasson |
| 2,935,906 A | | 5/1960 | Andreasson |
| 2,985,041 A | * | 5/1961 | Hayden .................... 76/108.6 |
| 3,010,345 A | | 11/1961 | Wagner |
| 3,085,453 A | * | 4/1963 | Mossberg ................. 76/108.1 |
| 3,120,768 A | * | 2/1964 | Williams ................... 76/108.1 |
| 3,555,935 A | | 1/1971 | Dorrenberg |
| 4,160,616 A | * | 7/1979 | Winblad .................... 408/229 |
| 4,212,569 A | * | 7/1980 | Andersson et al. ........... 408/59 |
| 5,971,674 A | * | 10/1999 | Holley ....................... 408/59 |

FOREIGN PATENT DOCUMENTS

| | | | | |
|---|---|---|---|---|
| DE | 44 43 736 | | 3/1996 | |
| DE | 196 05 157 | | 9/1996 | |
| DE | 196 04 279 | | 8/1997 | |
| FR | 2694220 A1 | * | 2/1994 | .................... 76/5.4 |
| JP | 41091 A | * | 12/1971 | ................ 76/108.6 |
| SU | 571338 A | * | 9/1977 | ................ 76/108.6 |
| SU | 615991 A | * | 7/1978 | ................ 76/108.1 |

* cited by examiner

DRILLING TOOL FOR MACHINE TOOLS AND METHOD FOR THE PRODUCTION THEREOF

The invention relates to a drilling tool for machine tools comprising a body of a drill, a cutting head arranged on the front side on the body of the drill, and a rearward drill shank, whereby the body of the drill has at least one chip conveyor groove extending from the cutting head over a part of its length, and, if necessary, at least one functional channel extending from the cutting head to the drill shank. The invention relates furthermore to a method for the production of such a drilling tool.

The known drilling tools of this type are usually produced by a chip-removing method, like turning, milling and drilling. The functional channels are produced in the body of the drill with the aid of a deep-hole drill and receive thereby a circular cross section. Mainly in the case of small drill diameters it is often difficult to house functional channels with a sufficiently large cross-sectional surface in the body of the drill. Furthermore the high production expense is felt to be disadvantageous in the known drilling tools.

Based on this the basic purpose of the invention is to develop a drilling tool with novel contours and a method for a particularly simple production of such drilling tools.

The inventive solution is based on the thinking that the body of the drill with its chip conveyor grooves and its functional channels can be chiplessly produced in a particularly simple manner. In order to achieve this, it is suggested according to the invention that a tubular blank, preferably in the cold state, is loaded on its wall simultaneously on several segments distributed over the periphery and moving axially along the blank surface with radially oscillating shaping forming forces, thereby forming at least one chip conveyor groove and at least one functional channel and/or at least one joint inside of the body of the drill. The tubular blank can thereby consist either of a ductile metal, for example of steel, or can be constructed as a raw product out of a sinterable material.

The often desired helical shape of the body of the drill is made possible by the tubular blank being loaded with oscillating shaping forming forces on forming segments moving both axially and also in peripheral directions along the blank surface, thereby producing at least one helically shaped chip conveyor groove and at least one helically shaped functional channel.

The forming of the tubular blank into the finished body of the drill can basically be done in one step. However, the problem arises thereby that at certain points a relatively large forming degree is necessary, which can result in a local tear formation. This is particularly true in the outlet area of the chip conveyor groove. In order to avoid this disadvantage, it is suggested according to an advantageous development of the invention that the blank is formed in steps in several passages. The blank can be tempered or annealed between two passages in order to remove the material stresses, which had built up earlier during the forming.

The blank is, during the forming process moved advantageously axially relative to the stationary forming segments, and is, if necessary, rotated about its axis relative to these segments. It is thereby possible to automatically rotate the blank about its axis during the forming process under the action of an axial feed force and the forming forces acting on it.

The forming forces, which oscillate advantageously with a frequency of 100 to 2000 Hz, are produced according to a preferred embodiment of the invention by a kneading or hammering works with several forming tools of a rotary kneading machine or a rotary hammering machine, which forming tools extend over each one of the forming segments. At least one chip conveyor groove is thereby produced by a shaping forming tool adapted to the contour of the respective chip conveyor groove, whereby the outlet of the chip conveyor groove at the end of a passage path is determined by the inlet contour of the shaping forming tool. The blank, which is moved in a feed direction, can be automatically rotated about its axis by the shaping forming tool, which engages the partially finished, helically shaped chip conveyor groove, which is to be produced. It is basically also possible to rotate the blank by means of a motor about its axis relative to the kneading or hammering works in dependency of its axial feed path. This enables also the creation of a variable helix pitch of the chip conveyor groove and of the functional channel.

According to a further preferred embodiment of the invention chip conveyor grooves are formed on at least two forming segments, which are spaced from one another in a peripheral direction, into the wall of the blank in such a manner that the wall portions in the area of two opposite-lying chip conveyor grooves sealingly abut one another on their inner surface thereby defining a joint. The respective wall portions can be cold-welded to one another in the area of the joint during the forming process when a chemically activated, oxide-free surface exists at the contacted points. The two wall portions, which abut one another in the area of the joint, can also be soldered to one another. Solder or soldering paste must, prior to the forcing process, be moved in between the wall portions which are to be connected, and must during or after the forming process be heated to a fusion or melting temperature.

Besides the soldering wire or the soldering paste, it is also possible to move in addition other foreign media, like separating means, damping means, or an inner coating into the inside space prior to the forming process. Furthermore at least one shaping insert can be placed into the blank, and can be embedded into the functional channels during the forming process. Rod-shaped, wireshaped, tubular or pearl-chainlike inserts of metal, ceramics, plastic and/or polyfluorotetraethylene can be used thereby. Depending on the use, the inserts can remain in the functional channels or can again be removed therefrom.

A cutting head is formed on or fastened to the front end of the body of the drill and a drill shank on or to the rearward end. It is thereby basically possible that the cutting head is formed chiplessly, preferably with the aid of a compression tool or swage to the body of the drill. As an alternative it is possible for the cutting head and/or the drill shank to be welded to the body of the drill by resistance welding and/or by friction welding. A soldered or glued connection is also possible at this point.

A further alternative embodiment of the invention provides that the cutting head and the drill shank are fastened with at least one tie rod to the body of the drill, which tie rod penetrates through the body of the drill preferably in the area of a functional channel. The tie rod can thereby be tensioned or clamped by screwing, wedging or compressing. It is furthermore possible to initially tension or prestress the tie rod by heating and subsequent cooling off. It is fundamentally also possible to use a tie rod having a hollow design. In reverse, the tie rod can have an outer contour supported in a functional channel leaving outer cavities open.

The material of the finished body of the drill is after the forming process advantageously heat-treated, hardened, sintered, and/or has a slidable and wear-resistant surface coating.

The body of the drill is in the drilling tools of the invention designed as a form part produced out of a tubular blank by rotary kneading or rotary hammering, whereby the functional channels have as a characteristic feature a non-circular cross section with at least one sharp-edged corner. The functional channels are advantageously triangular in cross section with one, two or three curved boundary sides, and with two or three sharp-edged corners. At least one of the boundary sides of the functional channels is curved concavely outwardly. It is thereby mainly the boundary side facing the adjacent chip conveyor groove. A third boundary side can be curved convexly.

According to a preferred embodiment of the invention at least two chip conveyor grooves are formed into the body of the drill, which chip conveyor grooves are defined at their flanks by helically curved lands having a partial-cylindrical outer surface defining flutes. In each land there is arranged a preferably triangular functional channel, which is noncircular in cross section. In the functional channels having a triangular cross section there are provided an outwardly convex outer boundary side, which is partially concentric with respect to the partial cylindrical outer surface, and two inner boundary sides, which follow the outer boundary side, are outwardly at least partially concave, and meet in an acute-angled triangular corner pointing toward the axis of the body of the drill. The two inner boundary sides are thereby essentially parallel with respect to the respectively adjacent flank portions of the chip conveyor grooves.

According to a preferred embodiment of the invention the triangular corners of two adjacent functional channels, which corners face one another, are separated from one another by a joint, whereby the joint extends essentially parallel with respect to the base of the groove of two chip conveyor grooves, which are adjacent to one another.

According to a further modification of the invention, the body of the drill has three chip conveyor grooves, which are defined at their flanks by helically curved lands. In addition, an axis-centrally arranged functional channel, which is triangular in cross section, is provided, the triangular corners of which taper pointedly or acutely radially outwardly and end in each one joint.

The mentioned joints can be closed off by a welding or soldering bridge.

At least one of the flanks of the chip conveyor grooves has advantageously a boundary edge, which is sharp-edged toward the adjacent outer surface of the flute.

A further preferred embodiment of the invention provides that the functional channels end in the area of the shank-side outlet of the chip conveyor grooves steplessly in an enlarged center supply channel. At least one of the functional channels can be loaded with a cooling lubricant through a center channel. The enlarged center channel can in the case of the minimum lubricating technique also be used as a depot for a lubricant. At least one of the functional channels can be equipped with at least one wire-shaped, tubular or cablelike insert preferably of metal, ceramic material and/or plastic.

It is fundamentally possible to fill at least one of the functional channels partially or completely with a filler, for example, designed as a damping medium. The lands can furthermore have, in the area of the partial-cylindrical outer surfaces, recesses for receiving wear-resistant support elements or plankings projecting over the partial-cylindrical outer surface. The chip conveyor grooves can also have recesses extending in the longitudinal direction of the grooves, for example, to receive reinforcing or vibration-hindering, wear-resistant support elements.

The cutting head and/or the drill shank can be chiplessly formed, for example, compressed, welded, soldered, glued or screwed to the body of the drill. Using these manufacturing methods, no metal chips are drawn from the body of the drill. The cutting head and the drill shank can furthermore be connected to the body of the drill with at least one tie rod penetrating through the body.

The invention will be discussed in greater detail hereinafter in connection with the drawings, in which:

FIGS. 1a, 1b, and 1c illustrate a diagram of the method sequence during the production of a body of a drill with two conveyor grooves and two functional channels;

DETAILED DESCRIPTION

Figure 1A:
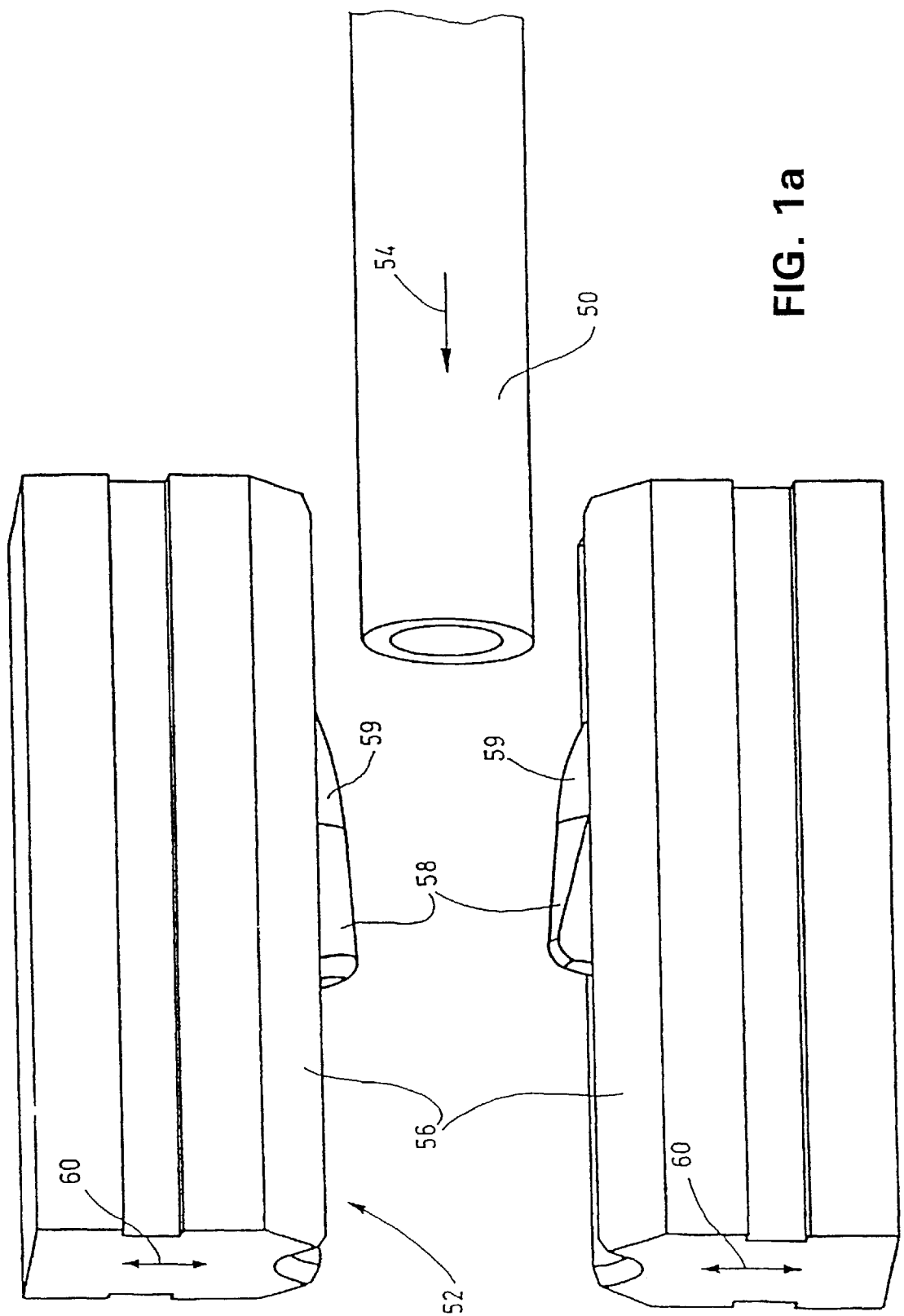

The drilling tool illustrated in the drawings (FIG. 5c) consists essentially of a body 10, a cutting head 12 arranged on the front side on the body of the drill 10, and a rearward drill shank 14 to clamp the drilling tool in a not illustrated tool holder of a machine tool. The body of the drill has two (FIGS. 3a and 3b) or three (FIG. 4) conveyor grooves 16, which are defined at their flanks by two helically curved lands 18. Furthermore two (FIGS. 3a and 3b) or three (FIG. 4) functioning channels 20 are provided in the body of the drill 10, which are helically curved with the same curvature as the lands 18 and extend along the lands 18 of the body of the drill 10. The functioning channels 20 end steplessly at the shank-side end in a common, axis-central supply channel 22. The exemplary embodiment according to FIG. 4 has in addition an axis central functional channel 24, which extends along the drill axis 32 and is helically twisted in its contour.

Figure 3A:
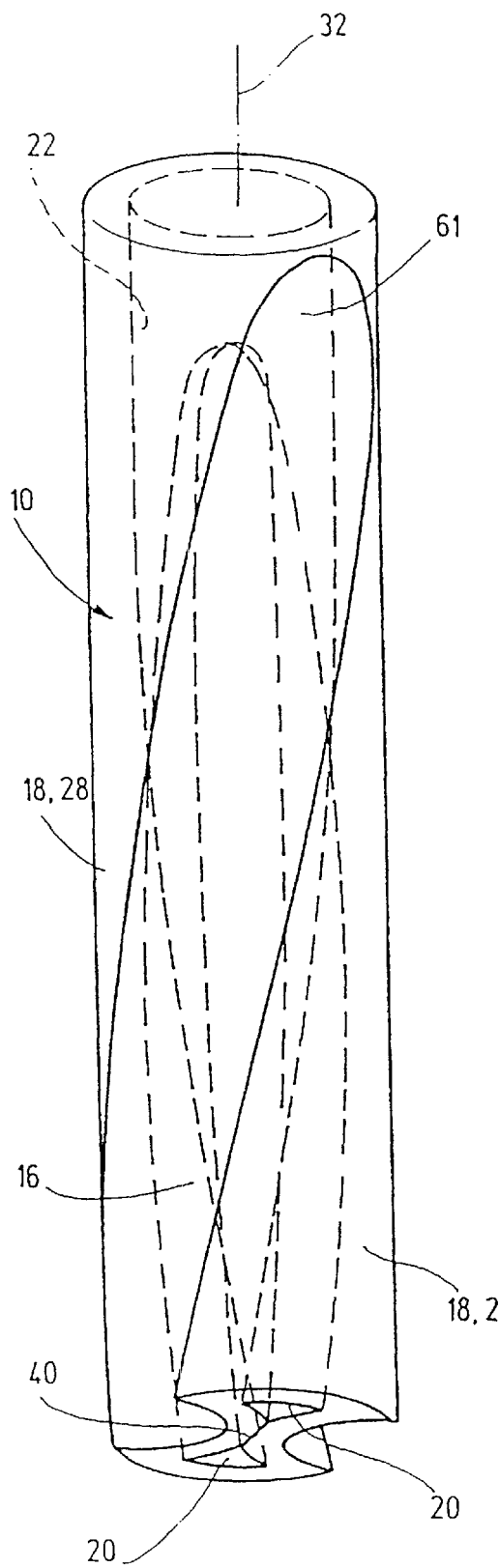
FIGS. 3a and 3b are a diagrammatic side view and a local cross-sectional illustration of the body of the drill produced with the method according to FIGS. 1a to 1c.
Figure 3B:
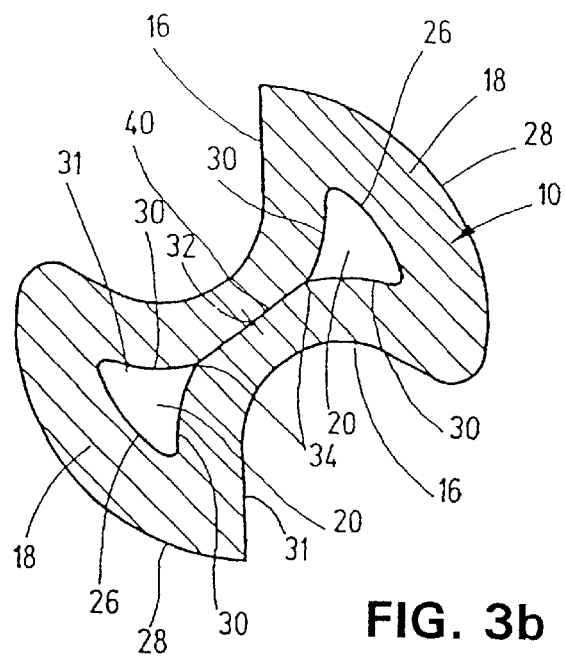
Figure 4:
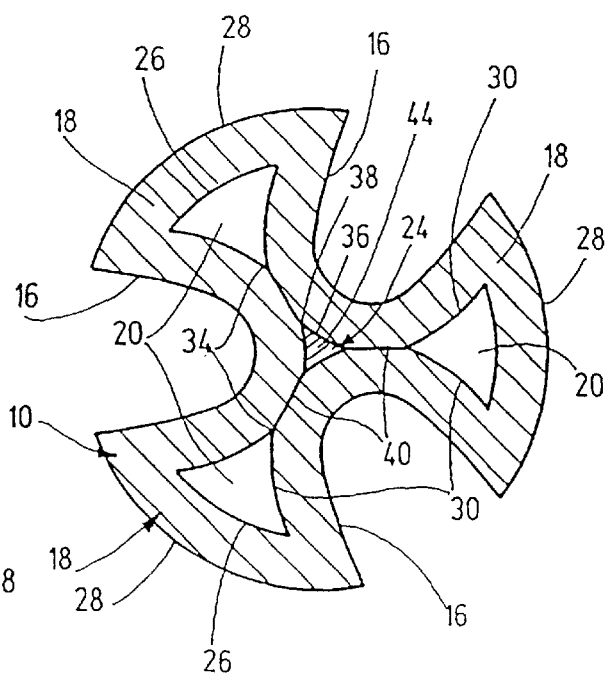
FIG. 4 is a local cross-sectional view of a body of a drill with three conveyor grooves, which body is produced by rotary kneading.

As can in particular be seen in FIGS. 3b and 4, the functional channels 20 have a triangular cross section, the outer boundary side 26 of which has an outwardly convex curvature, which is partially concentrical with respect to the partial-cylindrical outer surface 28 of the respective lands 18, and the inner boundary sides 30. The boundary sides follow the outer boundary side 26 inwardly, are at least partially concavely curved, and meet acute-angled in a triangular corner or edge 34 pointing toward the drill axis 32. The two inner boundary sides 30 extend essentially parallel with respect to the adjacent flank portions 31 of the chip conveyor grooves 16. The center functional channel 24 according to FIG. 4. has three outwardly concave boundary sides 36, which at their acute-angled boundary corners or edges 38 are directed toward the triangular corners 34 of the functional channels 20, which lie on the outside. A joint 40 extends between the triangular corners 34 facing one another according to FIG. 3b or corners 34 and 38 according to FIG.

4. The joint extends parallel to the base of the groove of two adjacent chip conveyor grooves 16, and preferably is closed off by a welding or soldering bridge.

Figure 6:
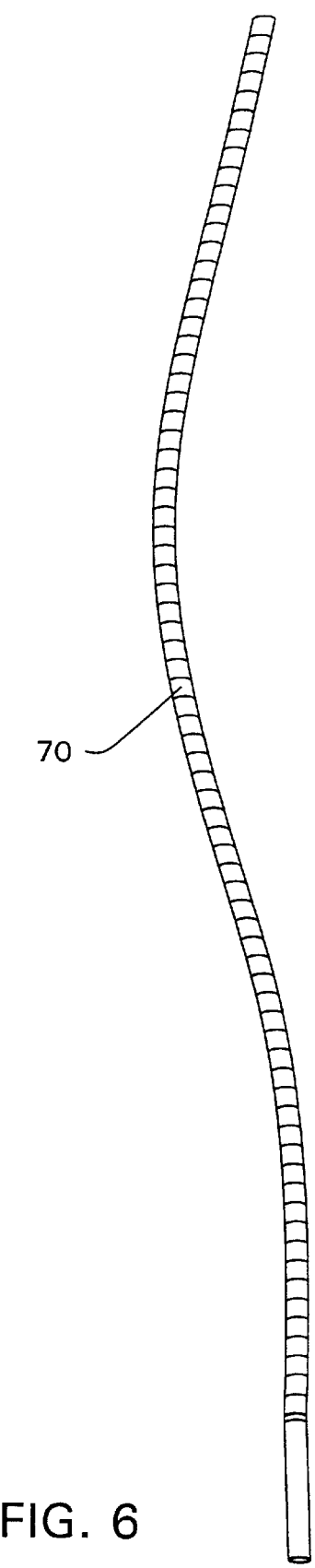
FIG. 6 is a side view of a rod-shaped, wire-shaped insert.

The functional channels 20 communicate with the outlet openings 42 in the cutting head 12. They can be loaded with cooling and lubricating means through the supply channel 22. It is basically possible to equip the functional channels 20, 24 with a preferably wire-shaped, tubular or cablelike insert 70, as shown in FIG. 6, for specific purposes. The channels 20, 24 can also be filled out with a filler 44, as in the case of the functional channel 24 according to FIG. 4.

Figure 1B:
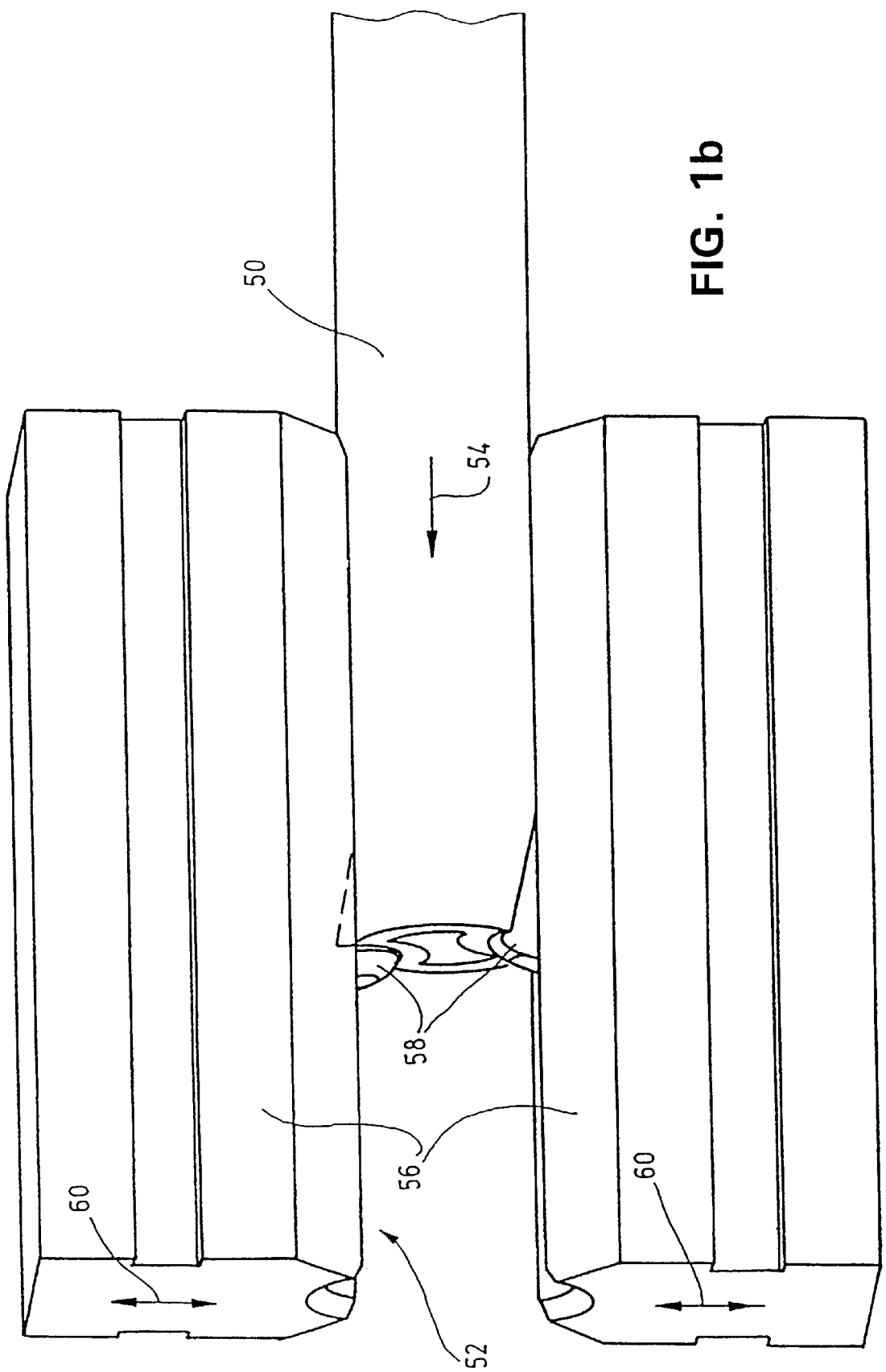
Figure 1C:
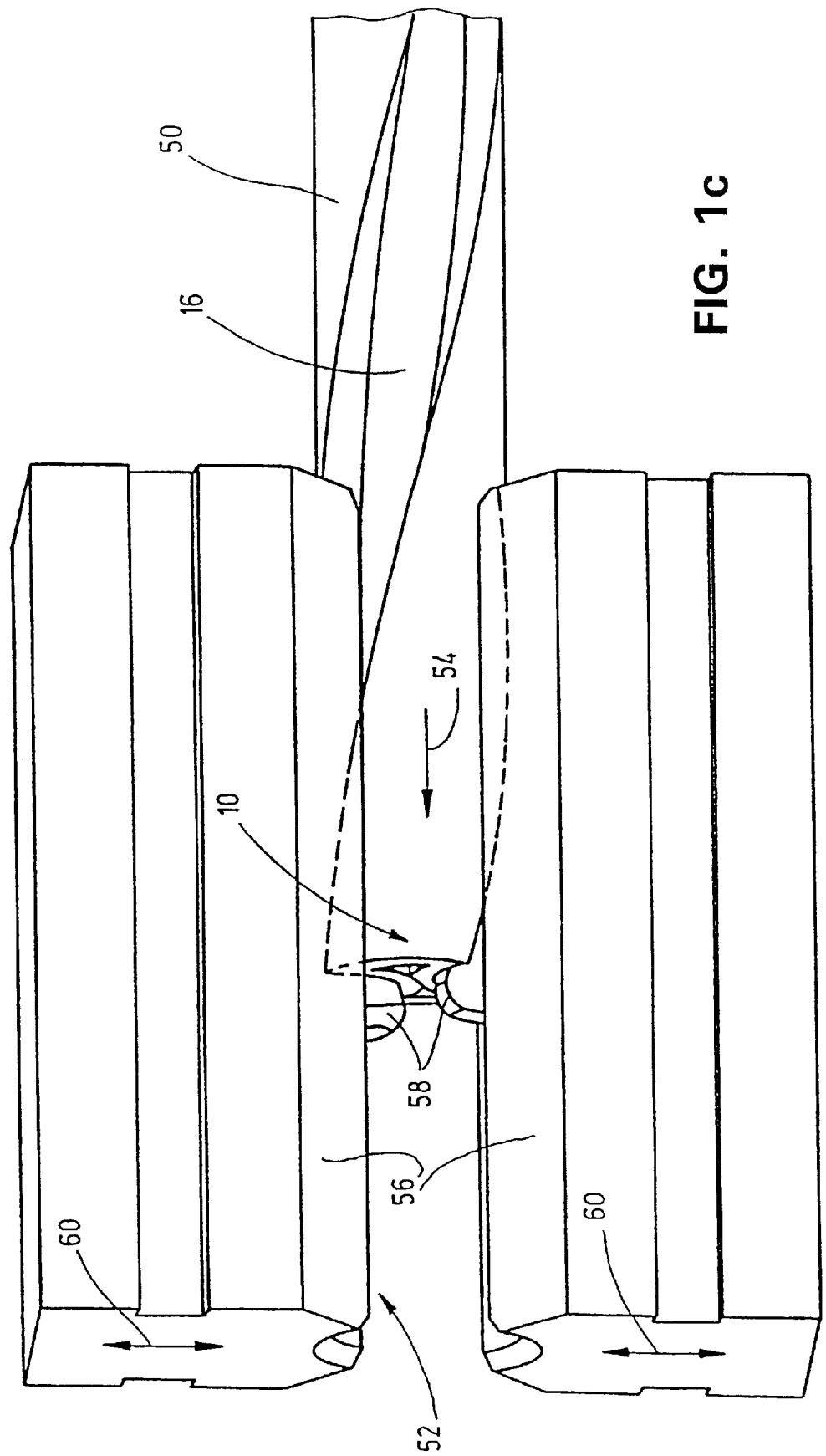
Figure 2:
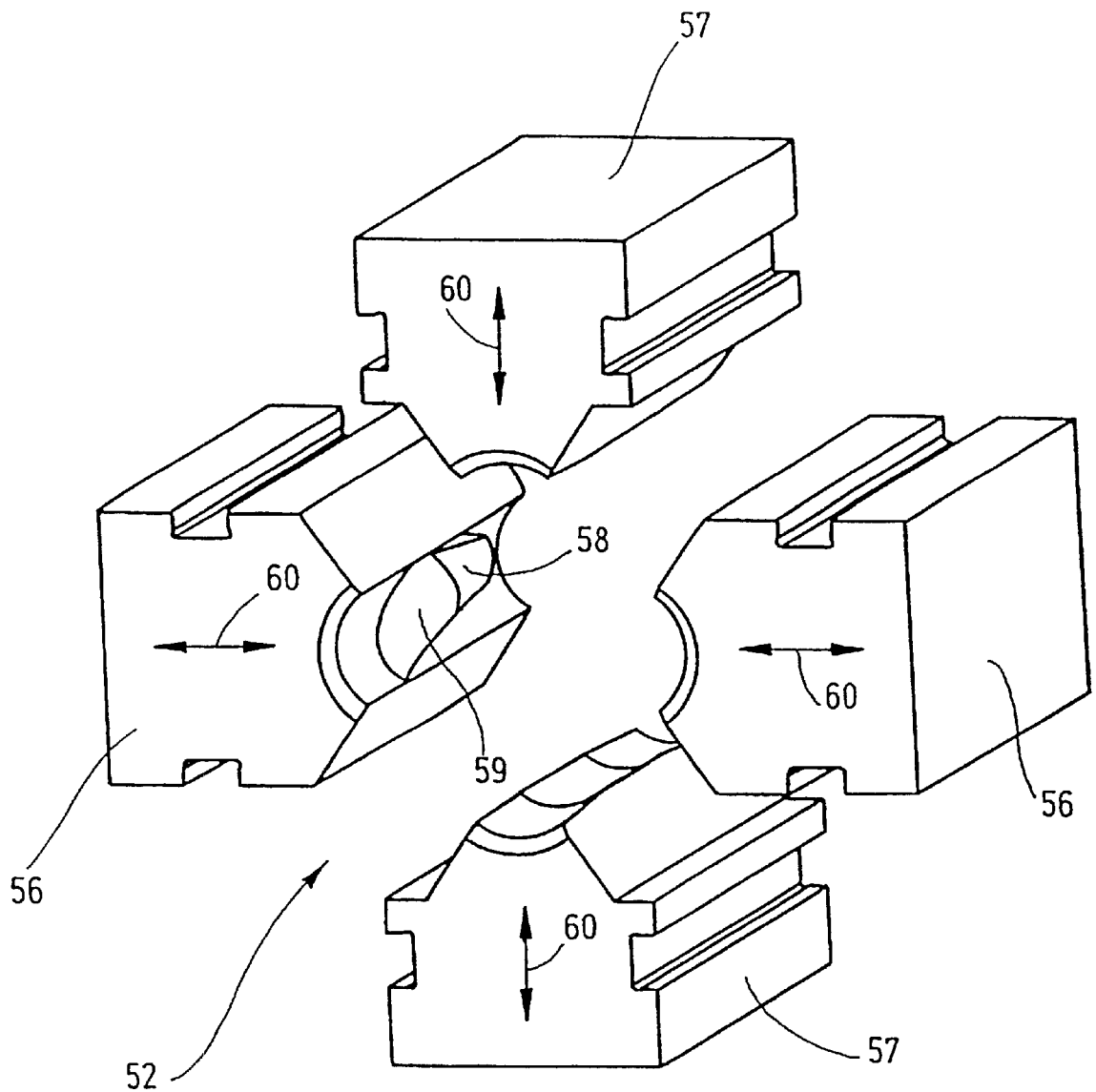
FIG. 2 is a diagrammatic illustration of the kneading tools used for the production of the body of the drill.

In order to produce the body of the drill 10, a pipe-shaped blank 50 made out of a formable steel is fed in the direction of the arrow 54 to the kneading or hammering works 52 of a rotary kneading machine or a rotary hammering machine. The kneading or hammering works 52 has several forming tools 56, 57 looping around a partial circumference of the blank 50, of which the forming tools 56, which are opposite to one another, have a shaping contour 58, which forms the chip conveyor grooves 16 of the body of the drill 10, and which is missing in the two other forming tools 57, which are designed as support tools. The conically designed inlet area 59 of the shaping contour 58 takes care on the one hand that the chip conveyor grooves 16 during passage of the blank 50 are slowly formed into the wall of the blank. On the other hand, it determines with its conical contour the shape of the rearward outlet area 61 of the chip conveyor grooves. FIG. 2 shows in particular that the shaping contours 58 in the tools 56 are aligned inclined with respect to the passage direction 54 so that the blank during passage through the forming tools 56, 57 can be rotated about its axis in the direction of the helix pitch of the chip conveying groove 16 to be produced. The forming tools 56 carry out radial oscillation movements in direction of the double arrows 60, which movements have a frequency of 100 to 2000 Hz and load thereby the portions of the blank 50, which portions pass by in the direction of the arrow 54, with shaping and calibrating forming forces. Both the chip conveyor grooves 16 and also the functional channels, which lie on the inside, are thereby formed. As can be seen in FIGS. 1b and 1c, the forming is done via several passages—in the illustrated exemplary embodiment in two—by the kneading or hammering works 52, whereby the forming tools 56, 57 are fed in closer in steps. In order to avoid a tear from forming, the blank 50 can be tempered or annealed between two passages. Portions of the inner surface of the blank rest during the last passage in the area of the joint 40 and are there either cold-welded or soldered with the help of an earlier supplied solder insert. The soldering operation is done either by heat under the action of the forming tools 56 or by subsequent heating of the finished body of the drill.

Figure 5A:
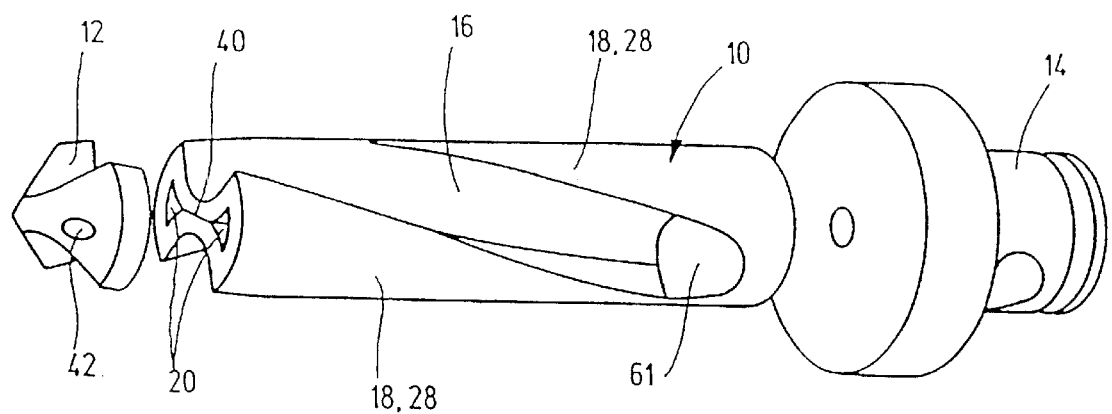
FIGS. 5a and 5b are each an exploded illustration of a drilling tool consisting of the body of the drill, the cutting head and the drill shank.
Figure 5B:
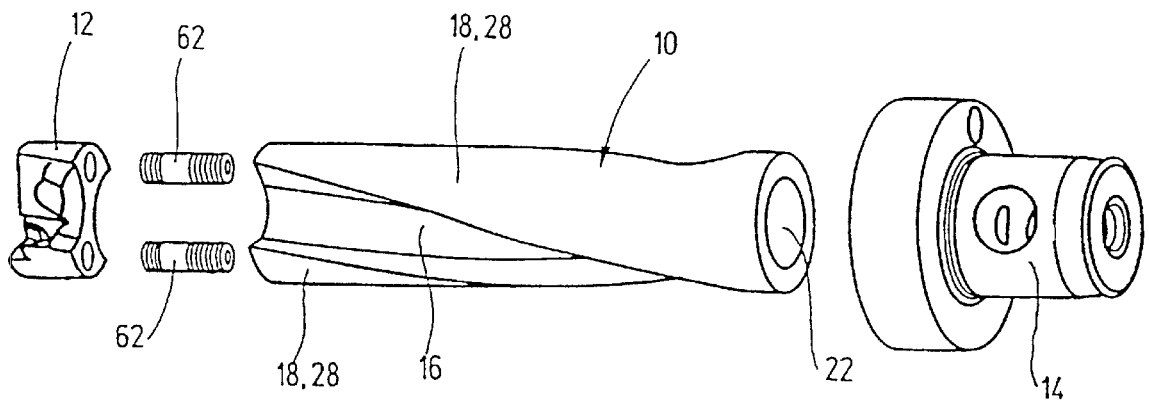
Figure 5C:
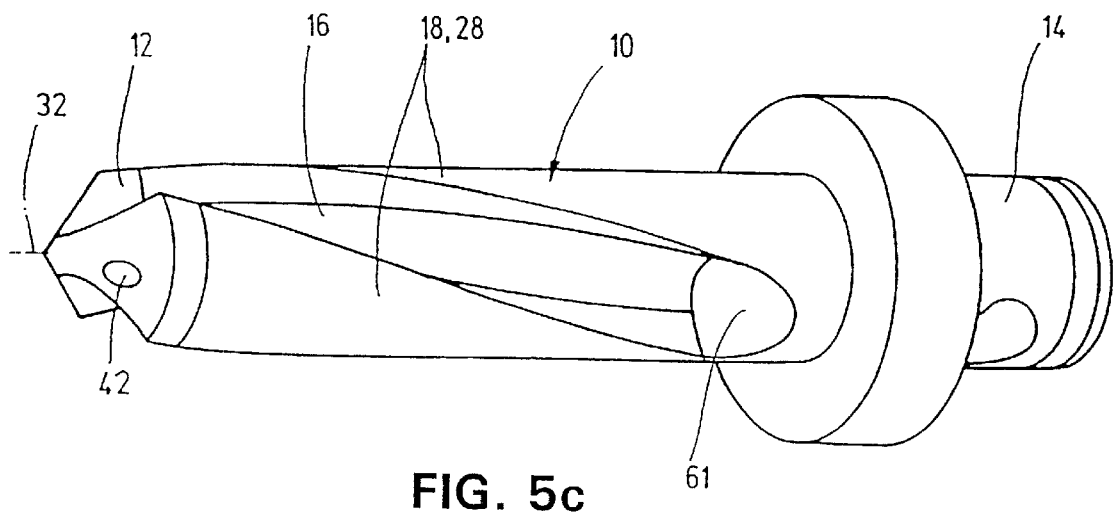
FIG. 5c is a diagrammatic illustration of the drilling tool according to FIGS. 5a and 5b in an assembled state.
Figure 7:
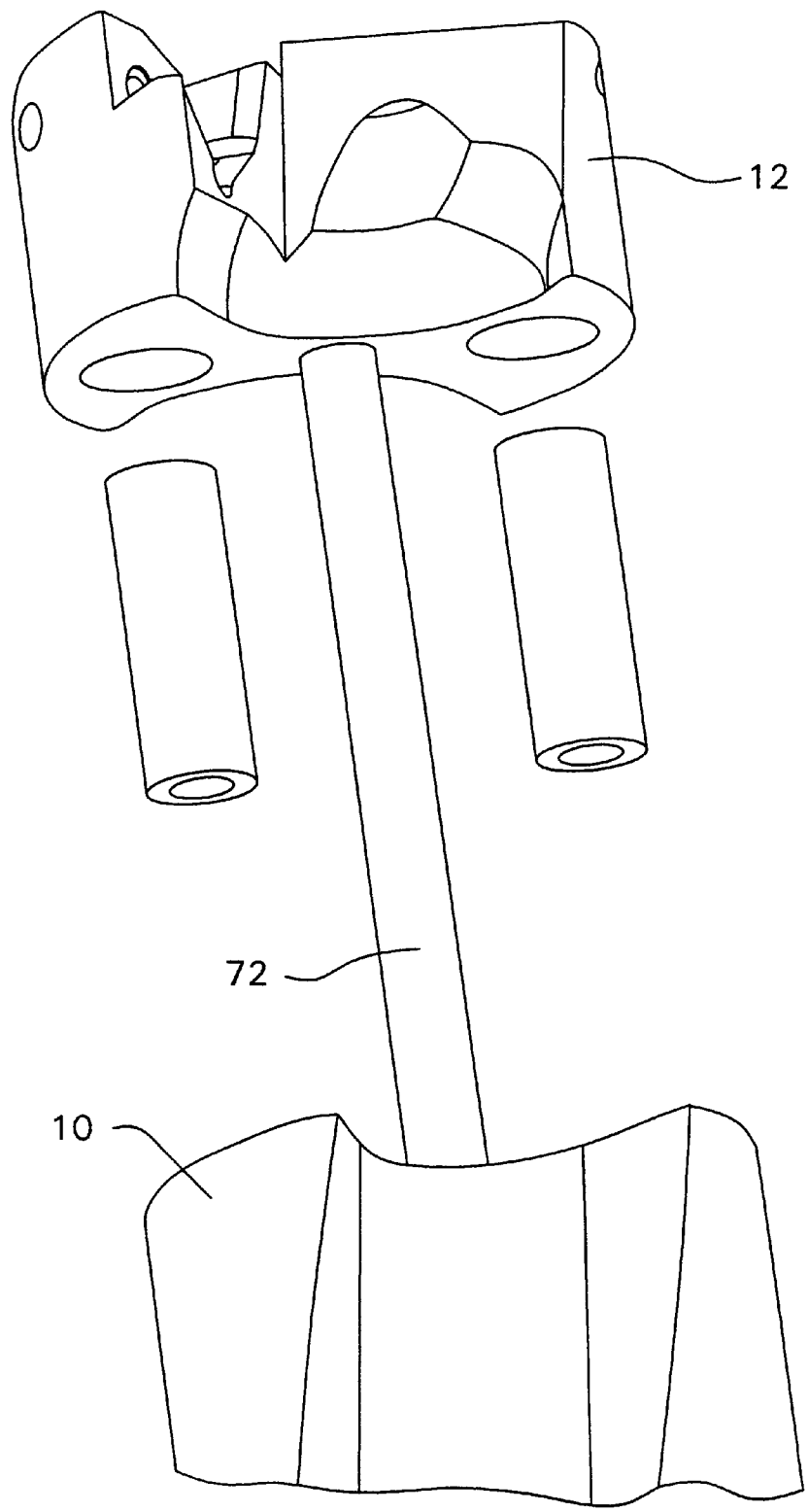
FIG. 7 is an exploded illustration of a drilling tool having a tie rod joining the drill body and cutting head.
Figure 8:
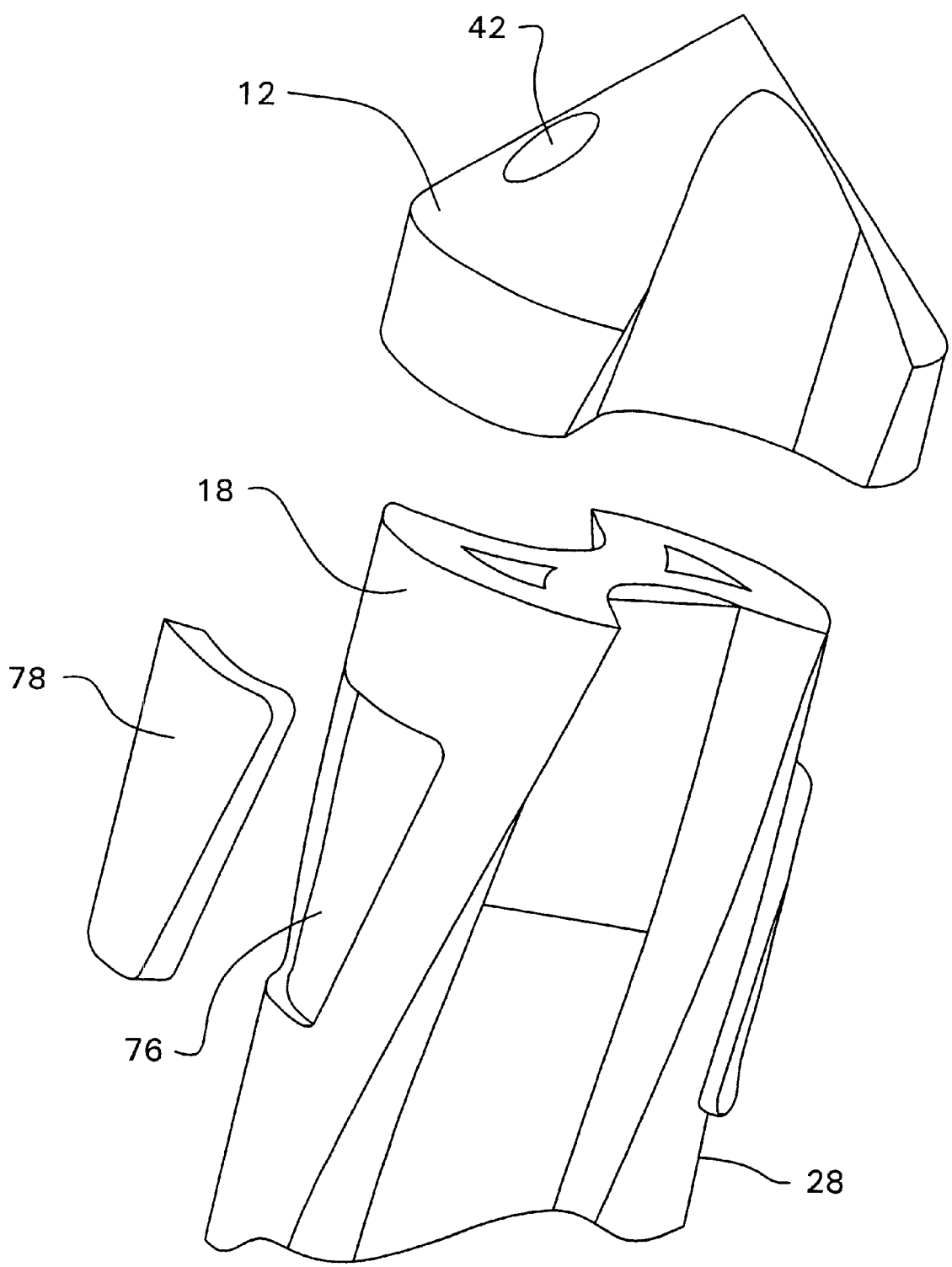
FIG. 8 is an exploded illustration of a drilling tool having recesses to receive wear-resistant support elements.

FIGS. 3a and 5a, 5b illustrate the finished body of the drill 10, which needs only to be connected to the cutting head 12 and the drill shank 14. In order to produce the connection, the connection partners (FIGS. 5a and 5b) are friction-welded, soldered, glued or are screwed together by means of screws 62 (FIG. 5b). A connection with the help of tie rods or a tie rod 72 shown in FIG. 7 can also be utilized. The tie rod 72 can penetrate through the cutting head 12, the body of the drill 10 and the drill shank 14 and is anchored under initial stress. The lands 18 can have, in the area of the partial-cylindrical outer surfaces 28, recesses 76 for receiving of wear-resistant support elements or plankings 78 projecting over the partial-cylindrical outer surface. The chip conveyor grooves 16 can also have recesses extending in the longitudinal direction of the grooves, for example, to receive reinforcing or vibration-hindering, wear-resistant support elements.

In conclusion the following is to be stated: The invention relates to a drilling tool for machine tools and a method for its production. The drilling tool has at least one chip conveyor groove 16 and at least one functional channel 20. In order to produce the body of the drill 10, the wall of a tubular metal blank 50 is simultaneously loaded or impinged upon by essentially radially oscillating shaping or forming forces in several forming segments spread over the periphery, moving in an axial direction along the surface of the blank, whereby at least one chip conveyor groove 16 is formed or shaped and at least one functional channel 20, 24 is formed. When chip conveyor grooves 16 are formed on at least two forming sections, which are spaced apart in peripheral direction, into the wall of the blank 50, the portions of the wall in the area of two oppositely lying chip conveyor grooves 16 abut one another sealingly defining at least two functional channels 20, 24 on their inner surface. The joint 40 thus created can be closed off by cold welding or soldering.

What is claimed is:

1. A method for the production of a drilling tool, onto a body of a drill of which is formed at least one chip conveyor groove and at least one functional channel, whereby a tubular blank is loaded on its wall simultaneously by several forming segments distributed over a periphery and moving axially along a blank surface with radially oscillating shaping forming forces, thereby forming at least one chip conveyor groove and at least one of a functional channel and a joint provided inside of the body of the drill, wherein the blank is automatically rotated about its axis during the forming process under the action of an axial feed force.

2. The method according to claim 1, wherein the tubular blank comprises a metal tubular blank or a tubular blank constructed as a raw product out of a sinterable material.

3. The method according to claim 1, wherein the tubular blank is loaded with the oscillating shaping forming forces on the forming segments moving both axially and also in peripheral direction along the blank surface, thereby producing the at least one chip conveyor groove as a helically shaped chip conveyor groove and the at least one functional channel as a helically shaped functional channel.

4. The method according to claim 1, wherein the body of the drill is formed in steps in several passes.

5. the method according to claim 4, wherein the blank is tempered and annealed between two passes.

6. The method according to claim 1, wherein the blank is axially moved relative to the forming segments during the forming process.

7. The method according to claim 1, wherein the blank is rotated about its axis relative to the forming segments during the forming process.

8. A method for the production of a drilling tool, onto the body of a drill of which is formed at least one chip conveyor groove and at least one functional channel, whereby a tubular blank, in a cold state, is loaded on its wall simultaneously by several forming segments distributed over a periphery and moving axially along a blank surface with radially oscillating shaping forming forces, thereby forming two oppositely lying chip conveyor grooves and at least one of a functional channel and a joint provided inside of the body of the drill, whereby the chip conveyor grooves are formed into the wall of the tubular blank by at least two of the forming segments, which are spaced from one another in peripheral direction, so that portions of the wall in the area of the two oppositely lying chip conveyor grooves provide their inner wall surface sealingly against one another forming a joint, wherein the wall portions, which rest against one another in the area of the joint, are cold-welded or are soldered to one another during the forming process.

9. The method according to claim 1, wherein the oscillating frequency of the forming forces is 100 to 2000 Hz.

10. The method according to claim 1, wherein the oscillating forming forces are produced by a kneading and hammering works with forming tools of a rotary kneading or a rotary hammering machine, which forming tools extend over each one of the forming segments.

11. The method according to claim 10, wherein the at least one chip conveyor groove is produced by a shaping forming tool adapted to the contour of the chip conveyor groove.

12. The method according to claim 11, wherein an outlet of the chip conveyor groove at the end of a passage path is determined by an inlet contour of the shaping forming tool.

13. The method according to claim 10, wherein the blank moved in feed direction is automatically rotated about its axis by the shaping forming tool, which engages the partially finished helically shaped chip conveyor groove, which is to be produced.

14. The method according to claim 10, wherein the blank is rotated by a motor about its axis relative to the kneading or hammering works in dependency of its axial feed path.

15. The method according to claim 1, wherein chip conveyor grooves are formed by at least two of the forming segments, which are spaced from one another in peripheral direction, into the wall of the tubular blank in such a manner that inner wall portions in the area of two opposite-lying chip conveyor grooves sealingly abut one another on their inner surface thereby defining the joint.

16. The method according to claim 15, wherein the wall portions, which abut one another in the area of the joint, are cold-welded during the forming process.

17. The method according to claim 15, wherein the inner wall portions, which abut one another in the area of the joint, are soldered to one another.

18. The method according to claim 17, wherein the solder needed for the soldering process is applied or inserted prior to the forming process onto or between the inner wall portions, which are to be connected with one another, and is heated to fusion or melting temperature during or after the forming process.

19. The method according to claim 1, wherein a foreign medium, including at least one of solder wire, solder paste, a separating means, a damping means or an inner coating, is placed into the inside of the blank prior to the forming process.

20. The method according to claim 1, wherein at least one insert is placed into the blank in the area of the functional channel, and is embedded in the functional channel during the forming process.

21. The method according to claim 20, wherein the insert is removed from the functional channel after the forming process.

22. The method according to claim 20, wherein the insert comprises a rod-shaped, wire-shaped, tubular or pearl-chain insert.

23. The method according to claim 20, wherein the insert comprises metal, ceramics, plastic or polyfluorotetraethylene.

24. The method according to claim 1, wherein a cutting head is formed on or secured to a front-side end of the body of the drill and a drill shank is formed or secured to a rearward end of the body of the drill.

25. The method according to claim 1, wherein a drill shank is formed on or secured to a rearward end of the body of the drill.

26. The method according to claim 24, wherein at least one of the cutting head and the drill shank are formed on the body of the drill by a swage without generating metal chips.

27. The method according to claim 24, wherein the cutting head is welded to the body of the drill by resistance welding.

28. The method according to claim 24, wherein the drill shank is welded to the body of the drill by friction welding.

29. The method according to claim 24, wherein at least one of the cutting head and the drill shank are soldered or glued to the body of the drill.

30. The method according to claim 24, wherein the cutting head and the drill shank are fastened by at least one tie rod to the body of the drill, the tie rod having a common axis with and penetrating through the body of the drill in the area of the functional channel.

31. The method according to claim 30, wherein the tie rod is tensioned by screwing.

32. The method according to claim 30, wherein the tie rod is tensioned by heating and subsequent cooling off.

33. The method according to claim 30, wherein the tie rod is hollow.

34. The method according to claim 30, wherein the tie rod has an outer contour supported in the functional channel.

35. The method according to claim 1, wherein the material of the body of the drill is after the forming process heat-treated, hardened, sintered or is provided with a surface coating.

36. A drilling tool for machine tools comprising a body of a drill, a cutting head arranged on a front side on the body of the drill, and a rearward drill shank, whereby the body of the drill includes at least two chip conveyor grooves extending from the cutting head over a part of its length, and at least two functional channels extending from the cutting head to the drill shank and having a triangular cross section with two or three curved boundary sides, wherein the body of the drill is designed as a circularly worked form part, and the functional channels form a joint at their boundary surfaces, which face one another, the joint being closed off by welding or soldering bridges.

37. The drilling tool according to claim 36, wherein at least one of the cutting head and the drill shank are anchored to the body of the drill with at least one tie rod penetrating through the body of the drill.

38. The drilling tool according to claim 36, wherein the functional channel includes two or three sharp-edged corners.

39. The drilling tool according to claim 36, wherein at least one of the cutting head and the drill shank are welded, soldered, glued or screwed to the body of the drill.

40. The drilling tool according to claim 36, wherein at least one of the boundary sides is outwardly concavely curved.

41. A drilling tool for machine tools comprising a body of a drill, a cutting head arranged on a front side on the body of the drill, and a rearward drill shank, whereby the body of the drill includes at least two chip conveyor grooves extending from the cutting head over a part of its length, and at least two functional channels extending from the cutting head to the drill shank and having a triangular cross section with two boundary sides that are curved outwardly concavely and a third boundary side that is curved convexly, wherein the body of the drill is designed as a circularly worked form part, and the functional channels form a joint at their boundary surfaces, which face one another, the joint being closed off by welding or soldering bridges.

42. The drilling tool according to claim 36, wherein at least the two chip conveyor grooves are defined at their flanks by helically curved lands having a partial-cylindrical outer surface, and the functional channels are each arranged in one of the lands.

43. The drilling tool according to claim 42, wherein the functional channels include an outer, outwardly convex boundary side, which is partially concentric with respect to the partial-cylindrical outer surface.

44. A drilling tool for machine tools comprising a body of a drill, a cutting head arranged on a front side on the body of the drill, and a rearward drill shank, whereby the body of the drill includes at least two chip conveyor grooves formed into the body and extending from the cutting head over a part of its length, with an outer, outwardly convex boundary side, which is partially concentric with respect to the partial-cylindrical outer surface and at least two functional channels extending from the cutting head to the drill shank and having triangular cross sections with two inner boundary sides, which follow the outer boundary side, and are outwardly at least partially concave, and meet in an acute-angled triangular corner pointing toward the axis of the body of the drill, wherein the body of the drill is designed as a circularly worked form part, and the functional channels form a joint at their boundary surfaces, which face one another, the joint being closed off by welding or soldering bridges.

45. The drilling tool according to claim 44, wherein the two inner boundary sides extend essentially parallel with respect to the respectively adjacent flank portions of the chip conveyor grooves.

46. The drilling tool according to claim 42, wherein triangular corners of the two adjacent functional channels, which corners face one another, are separated from one another by the joint.

47. The drilling tool according to claim 46, wherein the joint extends essentially parallel with respect to a base of the groove of two chip conveyor grooves, which are adjacent to one another.

48. The drilling tool according to claim 42, wherein the body of the drill includes three chip conveyor grooves defined at their flanks by the helically curved lands, and one of the functional channels comprises an axis-centrally arranged functional channel, having triangular corners that taper pointedly radially outwardly.

49. The method according to claim 1, wherein at least one of the cutting head and the drill shank are formed on the body of the drill by one of a compression tool, resistance welding, friction welding or solder so that chips of material are not formed or separated from the body during manufacturing thereof.

50. The drilling tool according to claim 36, wherein the functional channels end in the area of a shank-side outlet of the chip conveyor grooves steplessly in an enlarged center supply channel.

51. The drilling tool according to claim 36, wherein at least one of the functional channels is loaded with a cooling lubricant.

52. The drilling tool according to claim 36, wherein at least one of the functional channels is equipped with at least one wire-shaped, tubular or cable-shaped insert made of at least one of metal, ceramic material and plastic.

53. The drilling tool according to claim 36, wherein at least one of the functional channels is filled completely or partially with a filler.

54. The drilling tool according to claim 42, wherein the lands have outer coat side recesses for receiving wear-resistant support elements, which project over the partial-cylindrical outer surface.

55. The drilling tool according to claim 30, wherein the lands have recesses extending in longitudinal direction of the grooves to receive reinforcing or vibration-hindering, wear-resistant support elements.

56. The drilling tool according to claim 42, wherein at least one of the flanks of the chip-conveyor grooves is sharp-edged toward the adjacent land outer surface.

* * * * *